(12) United States Patent
Boulanov (10) Patent No.: US 7,120,585 B2
(45) Date of Patent: Oct. 10, 2006

(54) REMOTE SERVER OBJECT ARCHITECTURE FOR SPEECH RECOGNITION

(75) Inventor: Oleg Boulanov, Beverly, MA (US)

(73) Assignee: Eliza Corporation, Beverly, MA (US)

( * ) Notice: Subject to any disclaimer, the term of this patent is extended or adjusted under 35 U.S.C. 154(b) by 651 days.

(21) Appl. No.: 09/815,808

(22) Filed: Mar. 23, 2001

(65) Prior Publication Data

US 2001/0037197 A1 Nov. 1, 2001

Related U.S. Application Data

(60) Provisional application No. 60/192,091, filed on Mar. 24, 2000, provisional application No. 60/191,915, filed on Mar. 24, 2000, provisional application No. 60/192,090, filed on Mar. 24, 2000, provisional application No. 60/192,076, filed on Mar. 24, 2000.

(51) Int. Cl.
   G10L 11/00   (2006.01)
   G10L 15/18   (2006.01)
   H04M 1/64    (2006.01)
   G06F 15/16   (2006.01)

(52) U.S. Cl. ............... 704/270.1; 704/257; 379/88.17; 709/201

(58) Field of Classification Search ............ 704/270.1, 704/257, 231; 709/223, 224
See application file for complete search history.

(56) References Cited

U.S. PATENT DOCUMENTS

| 5,083,268 A | | 1/1992 | Hemphill et al. |
| 5,297,257 A | * | 3/1994 | Struger et al. ............... 700/83 |
| 5,369,726 A | | 11/1994 | Kroeker et al. |
| 5,457,768 A | * | 10/1995 | Tsuboi et al. ............... 704/231 |
| 5,522,044 A | * | 5/1996 | Pascucci et al. ............ 709/222 |
| 5,615,296 A | * | 3/1997 | Stanford et al. ......... 704/270.1 |
| 5,647,002 A | | 7/1997 | Brunson ..................... 380/49 |
| 5,659,542 A | | 8/1997 | Bell et al. ................... 370/496 |
| 5,675,723 A | * | 10/1997 | Ekrot et al. ................... 714/4 |
| 5,687,212 A | | 11/1997 | Kinser, Jr. et al. ............. 379/10 |
| 5,687,384 A | | 11/1997 | Nagase |

(Continued)

OTHER PUBLICATIONS

Okawa et al., "Estimation of Statistical Phoneme Center Considering Phonemic Environments," Department of Information and Computer Science, Waseda University, p. 1069-1072.

(Continued)

*Primary Examiner*—David Hudspeth
*Assistant Examiner*—Brian L. Albertalli
(74) *Attorney, Agent, or Firm*—McDermott Will & Emery LLP (57) ABSTRACT

A speech recognition system includes a line of service including a first server object coupled to a telephone network for receiving a voice data message from the telephone network, a second server object having a first connection to the first server object for receiving the voice data message from the first server object and converting the voice data message to a phonetic data message, a third server object having a second connection to the second server object for receiving the phonetic data message from the second server object and converting the phonetic data message to a syntactic data message and a fourth server object having a third connection to the third server object for receiving the syntactic data message from the third server object and converting the syntactic data message to a semantic data message, which is representative of the voice data message. The first, second, third and fourth server objects may be remote with respect to each other and the first, second and third connections are formed over a first computer network.

36 Claims, 4 Drawing Sheets

U.S. PATENT DOCUMENTS

| | | | |
|---|---|---|---|
| 5,729,656 A | 3/1998 | Nahamoo et al. | |
| 5,748,841 A | 5/1998 | Morin et al. | |
| 5,799,276 A | 8/1998 | Komissarchik et al. | 704/251 |
| 5,822,728 A | 10/1998 | Applebaum et al. | 704/254 |
| 5,822,729 A | 10/1998 | Glass | 704/255 |
| 5,825,977 A | 10/1998 | Morin et al. | 395/2.64 |
| 5,835,890 A | 11/1998 | Matsui et al. | 704/255 |
| 5,864,614 A | 1/1999 | Farris et al. | 379/207 |
| 5,881,230 A * | 3/1999 | Christensen et al. | 709/203 |
| 5,897,616 A * | 4/1999 | Kanevsky et al. | 704/246 |
| 5,941,996 A * | 8/1999 | Smith et al. | 714/47 |
| 5,960,399 A * | 9/1999 | Barclay et al. | 704/270.1 |
| 5,974,409 A * | 10/1999 | Sanu et al. | 707/3 |
| 6,112,176 A * | 8/2000 | Goldenthal et al. | 704/257 |
| 6,134,548 A | 10/2000 | Gottsman et al. | |
| 6,138,249 A * | 10/2000 | Nolet | 714/25 |
| 6,154,720 A | 11/2000 | Onishi et al. | |
| 6,173,261 B1 | 1/2001 | Arai et al. | |
| 6,173,279 B1 | 1/2001 | Levin et al. | |
| 6,192,338 B1 * | 2/2001 | Haszto et al. | 704/257 |
| 6,230,190 B1 * | 5/2001 | Edmonds et al. | 709/213 |
| 6,233,561 B1 | 5/2001 | Junqua et al. | |
| 6,247,057 B1 * | 6/2001 | Barrera, III | 709/229 |
| 6,343,313 B1 * | 1/2002 | Salesky et al. | 709/204 |
| 6,366,886 B1 * | 4/2002 | Dragosh et al. | 704/270.1 |
| 6,456,974 B1 * | 9/2002 | Baker et al. | 704/270.1 |
| 6,615,171 B1 * | 9/2003 | Kanevsky et al. | 704/246 |
| 6,615,172 B1 * | 9/2003 | Bennett et al. | 704/257 |
| 6,678,659 B1 * | 1/2004 | Van Kommer | 704/260 |
| 2001/0008556 A1 * | 7/2001 | Bauer et al. | 379/265.06 |
| 2002/0097692 A1 * | 7/2002 | Ruotoistenmaki | 370/328 |
| 2002/0152292 A1 * | 10/2002 | Motoyama et al. | 709/223 |

OTHER PUBLICATIONS

Atlas et al., "Quadratic Detectors For General Nonlinear Analysis of Speech,"Interactive Systems Design Laboratory, p. II-9-II-12, 1992.
PCT International Search Report, Appln. No. PCT/US01/09370, Mailing date Jun. 12, 2001.
PCT International Search Report, International Application No. PCT/US01/09300, Filing Date: Mar. 23, 2001.
PCT International Search Report, International Application No. PCT/US01/09549, Filing Date: Mar. 23, 2001.

* cited by examiner

REMOTE SERVER OBJECT ARCHITECTURE FOR SPEECH RECOGNITION

CROSS REFERENCES TO RELATED APPLICATIONS

This application claims the benefit of priority from commonly owned U.S. Provisional Patent Application Ser. No. 60/192,091, filed Mar. 24, 2000, entitled COMBINED SYNTACTIC AND SEMANTIC SEARCH, PARSING, AND APPLICATION ACCESS; U.S. Provisional Patent Application Ser. No. 60/191,915, filed Mar. 24, 2000, entitled SPEECH RECOGNITION APPLICATION TECHNOLOGY USING WEB, SCRIPTING AND SEMANTIC OBJECTS; U.S. Provisional Patent Application Ser. No. 60/192,090, filed Mar. 24, 2000, entitled A NOVEL APPROACH TO SPEECH RECOGNITION; and U.S. Provisional Patent Application Ser. No. 60/192,076, filed Mar. 24, 2000, entitled REMOTE SERVER OBJECT ARCHITECTURE FOR SPEECH RECOGNITION.

This application is also related to the following copending U.S. patent applications, the contents of which are incorporated herein in their entirety by reference:

"A Novel Approach To Speech Recognition," U.S. patent application Ser. No. 09/815,768;

"Phonetic Data Processing System and Method," U.S. patent application Ser. No. 09/815,769; and "Web-Based Speech Recognition With Scripting and Semantic Objects," U.S. patent application Ser. No. 09,815,726.

FIELD OF THE INVENTION

The present invention relates generally to a remote server object architecture for speech recognition and more particularly to a speech recognition system including a number of remote server objects which enable the speech recognition system to transparently process incoming voice data over a number of computer systems within a network.

BACKGROUND OF THE INVENTION

In the new, connected economy, it has become increasingly important for companies or service providers to become more in tune with their clients and customers. Such contact can be facilitated with automated telephonic transaction systems, in which interactively-generated prompts are played in the context of a telephone transaction, and the replies of a human user are recognized by a speech recognition system. The answers given by the respondent are processed by the system in order to convert the spoken words to meaning, which can then be utilized interactively, or stored in a database.

In order for a computer system to recognize the words that are spoken and convert these words to text, the system must be programmed to phonetically break down the words and convert portions of the words to their textural equivalents. Such a conversion requires an understanding of the components of speech and the formation of the spoken word. The production of speech generates a complex series of rapidly changing pressure waveforms. These waveforms comprise the basic building blocks of speech, known as phonemes. Vowel and consonant sounds are made up of phonemes and have many different characteristics, depending on which components of human speech are used. The position of a phoneme in a word has a significant effect on the ultimate sound generated. A spoken word can have several meanings, depending on how it is said. Speech scientists have identified allophones as acoustic variants of phonemes and use them to more explicitly define how a particular word is formed.

While there are several distinct methods for analyzing the spoken word and extracting the information necessary to enable the recognition system to convert the speech to word-strings, including Hidden Markov modeling and neural networks, these methods generally perform similar operations. The differences in these methods are typically in the manner in which the system determines how to break the phonetic signal into portions that define phonemes. Generally, a speech recognition system first converts an incoming analog voice signal into a digital signal. The second step is called feature extraction, wherein the system analyzes the digital signal to identify the acoustic properties of the digitized signal. Feature extraction generally breaks the voice down into its individual sound components. Conventional techniques for performing feature extraction include subband coding Fast Fourier Transforms and Linear Predictive Coding. Once the signal has been analyzed, the system then determines where distinct acoustic regions occur. The goal of this step is to divide the acoustic signal into regions that will be identified as phonemes which can be converted to a textural format. In isolated word systems, this process is simplified, because there is a pause after each word. In continuous speech systems, however, this process is much more difficult, since there typically are no breaks between words in the acoustic stream. Accordingly, the system must be able not only to break the words themselves into distinct acoustic regions, but must also be able to separate consecutive words in the stream. It is in this step that conventional methods such as Hidden Markov modeling and neural networks are used. The final step involves comparing a specific acoustic region, as determined in the previous step, to a known set of templates in a database in order to determine the word or word portion represented by the acoustic signal region. If a match is found, the resulting textural word is output from the system. If one is not, the signal can either be dynamically manipulated in order to increase the chances of finding a match, or the data can be discarded and the system prompted to repeat the question to the respondent, if the associated answer cannot be determined due to the loss of the data.

SUMMARY OF THE INVENTION

The present invention is directed to implementation of computing-intensive speech recognition systems that require simultaneous operations of multiple functional units. This is accomplished by having a number of discrete servers which can be located in separate computer systems. Four types of functions related to speech recognition have been identified and isolated in different operating units. Performance and maintenance is enhanced by having a unidirectional data pipeline, from one server to another, while control flow streams in the opposite direction.

The configuration of the system provides the ability to separate and encapsulate the modular high-level functions associated with each server, which are controlled by a central monitoring system. Consequently, the system is capable of enabling changes to transactions and maintenance on the system without shutting down the entire system and is able to compensate for malfunctions in any one or more of the components of the system without affecting the operation of the entire system. System-wide load balancing is made possible by means of borrowing functional servers from the applications having low load and reassigning them to more demanding applications.

According to one aspect of the invention, a speech recognition system includes a line of service including a first server object coupled to a telephone network for receiving a voice data message from the telephone network, a second server object having a first connection to the first server object for receiving the voice data message from the first server object and converting the voice data message to a phonetic data message, a third server object having a second connection to the second server object for receiving the phonetic data message from the second server object and converting the phonetic data message to a syntactic data message and a fourth server object having a third connection to the third server object for receiving the syntactic data message from the third server object and converting the syntactic data message to a semantic data message, which is representative of the voice data message. The first, second, third and fourth server objects may be remote with respect to each other and the first, second and third connections are formed over a first computer network.

The fourth server object may be coupled to a second computer network for receiving an application code from a client of the second computer network, the application code providing control data for the operation of the speech recognition system. The first computer and the second computer network may be one of a local area network and the internet. The first, second and third connections may be formed from named pipes. The system may further include a control monitor for controlling the configuration of the first, second, third and fourth server objects in the line of service. At least one of the first, second, third and fourth server objects periodically may transmit a status signal to the system monitor, wherein the transmission of the periodic status signal from the at least one of the first, second, third and fourth server objects to the system monitor indicates that the one of the first, second, third and fourth server objects is operational. A nontransmission of the periodic status signal from the at least one of the first, second, third and fourth server objects to the system monitor indicates that the one of the first, second, third and fourth server objects is disabled. The system may further include at least one backup server object which is configured into the system by the system monitor when the at least one of the first, second, third and fourth server objects is disabled. The first, second, third and fourth server objects are configured by the system monitor according to the Distributed Component Object Model (DCOM). Each of the first, second, third and fourth server objects may include a post office for addressing and routing the voice data message, the phonetic data message, the syntactic data message and the semantic data message through the line of service from the telephone network to the second computer network. The system may further include additional lines of service connected between the telephone network and the second computer network.

According to another aspect of the invention, a method of processing speech includes:

A. receiving, at a first server object, a voice data message from a telephone network;

B. transmitting the voice data message over a first computer network to a second server object;

C. converting the voice data message to a phonetic data message in the second server object;

D. transmitting the phonetic data message from the second server object to a third server object over the first computer network;

E. converting the phonetic data message to a syntactic data message in the third server object;

F. transmitting the syntactic data message from the third server object to a fourth server object over the first computer network; and G. converting the syntactic data message to a semantic data message representative of the voice data message in the fourth server object.

The method may further include downloading an application code from a second computer network, wherein the application code includes control code for controlling operation of the first, second, third and fourth server objects. The first computer network and the second computer network is one of a local area network and the internet. Steps B, D and F may include transmitting the voice data message, the phonetic data message and the syntactic data message, respectively, over named pipes. The method may further include configuring the first, second, third and fourth server objects with a control monitor. The method may further include the step of at least one of the first, second, third and fourth server objects transmitting a status signal to the control monitor, wherein the transmission of the periodic status signal from the at least one of the first, second, third and fourth server objects to the control monitor indicates that the at least of the first, second, third and fourth server objects is operational. The nontransmission of the periodic status signal from the at least one of the first, second, third and fourth server objects to the control monitor may indicate that the at least of the first, second, third and fourth server objects is disabled. the first, second, third and fourth server objects are configured by the system monitor according to the Distributed Component Object Model (DCOM). The method may further include processing the semantic data message in the fourth server object according to the application code.

According to yet another aspect of the invention, a speech recognition system includes a line of service having a voice server object coupled to a telephone network for receiving a voice data message from the telephone network, a speech recognition server having a connection to the voice server object for receiving the voice data message from the voice server object and converting the voice data message to a phonetic data message and converting the phonetic data message to a syntactic data message and a task server object having a connection to the speech recognition server for receiving the syntactic data message from the speech recognition server object and converting the syntactic data message to a semantic data message, which is representative of the voice data message. The connections between the voice server object, the speech recognition server and the task server object are formed over a first computer network.

The task server object may be coupled to a second computer network for receiving an application code from a client of the second computer network, the application code providing control data for the operation of the speech recognition system. The first computer network and the second computer network may be one of a local area network and the internet, and the connections may be formed from named pipes. The system may further include a control monitor for controlling the configuration of the voice server object, the speech recognition server and the task server object in the line of service. At least one of the voice server object, the speech recognition server and the task server object may periodically transmit a status signal to the system monitor, wherein the transmission of the periodic status signal from the at least one of the voice server object, the speech recognition server and the task server object to the system monitor indicates that the one of the voice server object, the speech recognition server and the task server object is operational. A nontransmission of the periodic status signal from the at least one of the voice server object, the speech recognition server and the task server object to the system monitor may indicate that the at least one of the voice server object, the speech recognition server and the task server object is disabled. The system may further include at least one backup server object which is configured into the system by the system monitor when the at least one of the voice server object, the speech recognition server and the task server object is disabled. The voice server object, the speech recognition server and the task server object may be configured by the system monitor according to the Distributed Component Object Model (DCOM). Each of the voice server object, the speech recognition server and the task server object may include a post office for addressing and routing the voice data message, the phonetic data message, the syntactic data message and the semantic data message through the line of service from the telephone network to the second computer network. The system may further include additional lines of service connected between the telephone network and the second computer network. The speech recognition server may include an acoustic server object for receiving the voice data message from the voice server object and converting the voice data message to the phonetic data message and a symbolic server object for receiving the phonetic data message from the acoustic server object and converting the phonetic data message to the syntactic data message. The voice, acoustic, symbolic and task server objects are remote with respect to each other.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

The present invention is directed to a speech recognition system which can be used to conduct automated telephone transactions. In general, the system receives an application over either a local network or the internet from a party conducting the transaction. The application contains the code that operates the transaction. The transaction prompts are presented to the respondent over a telephone network, and the replies are received by the speech recognition system spoken by the respondent. The voice data that represent the answers given by the respondent are broken down into a phonetic stream of data which can be recognized by the system. The system converts the phonetic stream of data into a word list or syntactic data message which is then converted to a semantic representation of the spoken answers given by the respondent. The semantic representation can then be transmitted to a transaction initiator over the local network or the internet.

Figure 1:
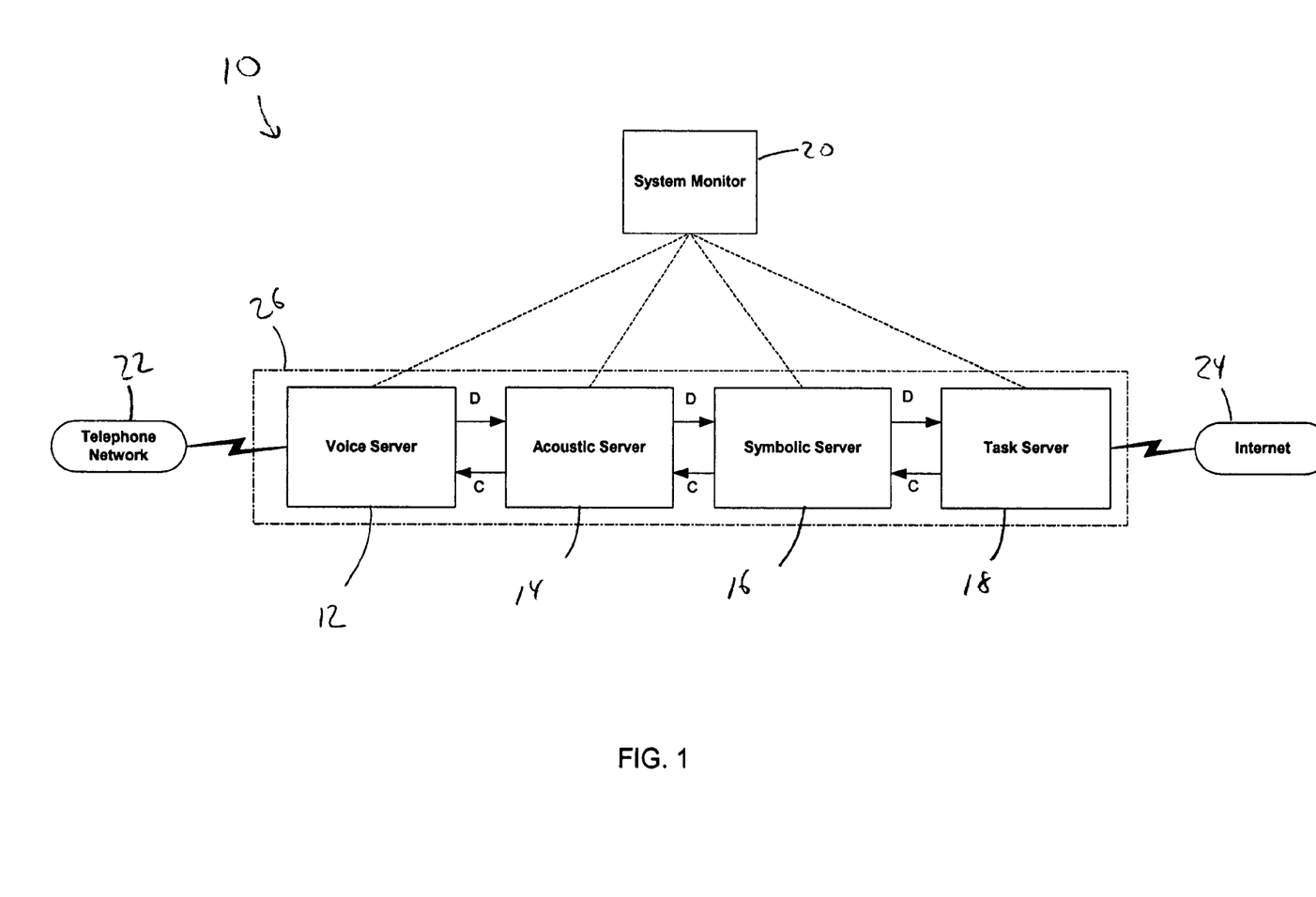
FIG. 1 is a schematic block diagram of the remote server object architecture for speech recognition system in accordance with the present invention.

FIG. 1 is a schematic block diagram of the speech recognition system 10 of the present invention. The system 10 includes a voice server 12, an acoustic server 14, a symbolic server 16 and a task server 18, all of which are connected to a network, such as a LAN, and which operate under the control of system monitor 20. Servers 12, 14, 16 and 18 are configured as separate Remote Server Objects (RSO) which are located on separate computer systems and which perform a different function on the data stream. As shown in FIG. 1, servers 12, 14, 16 and 18 form a single line of service 26 between a telephone network 22 and the internet 24. As is discussed below, a plurality of lines of service can be implemented similar to the line 26.

In general, the voice server 12 receives the audio voice stream from the telephone network 22, acoustic server 14 converts the audio voice stream into an output phonetic stream, symbolic server 16 converts the phonetic stream to a syntactic data message and task server converts the syntactic data message output from the symbolic sever 16 into a semantic representation of the original input audio voice stream. The functions of the servers 12, 14, 16 and 18 are discussed in greater detail below.

Each RSO is implemented as a discrete object according to the Distributed Component Object Model (DCOM). DCOM is a set of Microsoft® concepts and program interfaces in which a client program object can request services from server program objects on other computers in a network. Configuring each RSO as a DCOM object enables each RSO to perform its operation on the data being input to the system before the results of the operation are passed to the next RSO for further processing. Accordingly, each RSO in the system is capable of performing its specialized high-level function in a modular fashion before passing the necessary data to the next RSO.

By forming the RSO architecture as DCOM objects, each object in the system 10 can be configured from different implementations, technologies, hardware and system configurations, all within the same system architecture. The high-level functions carried out by each RSO remain independent of the implementation details of the underlying architecture and therefore enable the system to be operated in a transparent manner from the point of view of the party conducting the transaction and the respondent. Furthermore, the implementation of the system independent of the underlying architecture allows re-use of common system components, which allows a maximum of tested, reliable software to be used. Furthermore, separable functions allow the modular components to be tested in isolation, thus simplifying maintenance and support.

As shown in FIG. 1, each RSO 12, 14, 16 and 18 include a plurality of data lines D and control lines C connected therebetween. As is described below, the connection between RSO is via named pipes. The lines D and C in FIG. 1 are simply schematic representations of the flow of data in the system 10. The system is a context independent, data feed forward design, which means that voice data flows in one direction only, from the telephone network 22 to the internet 24. Control data flows from the application downloaded by the task server 18 from the internet 24 in the opposite direction of the voice data in order to enable the application to control the RSO's according to the specific code in the application.

Figure 2:
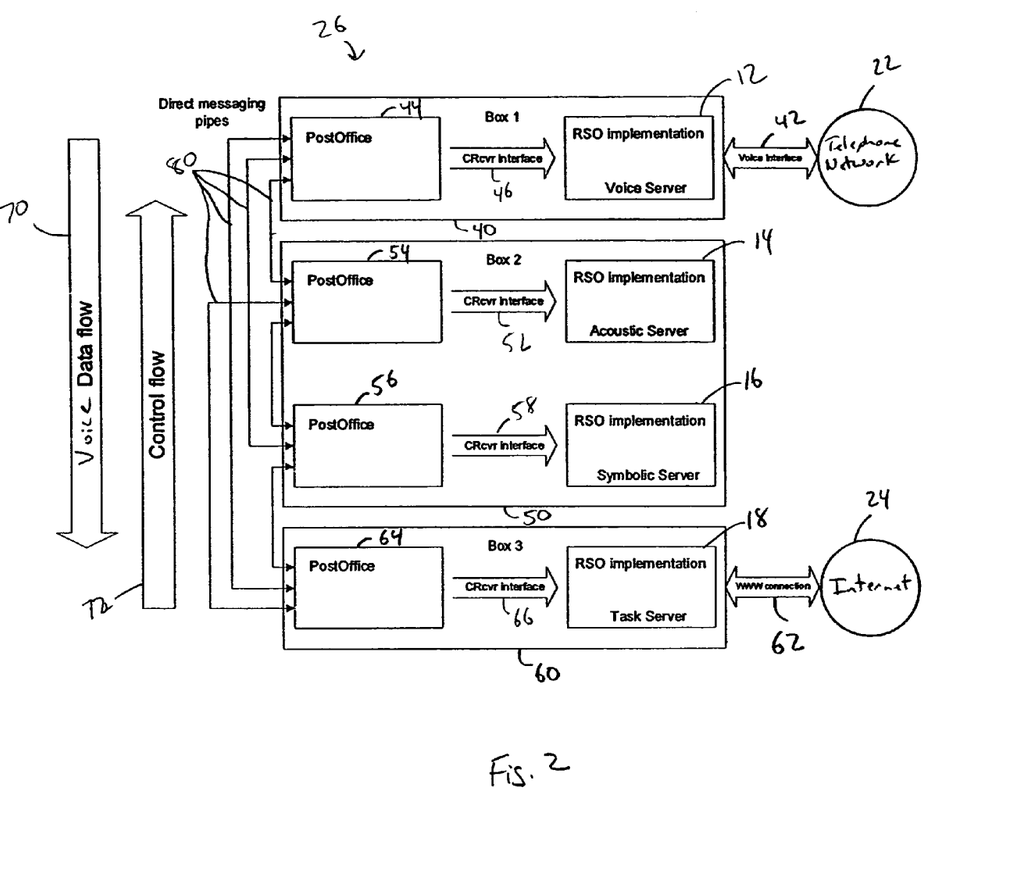
FIG. 2 is a schematic block diagram of the remote server objects associated with one line of service in accordance with the present invention.

The flow of voice data and control data will now be discussed with reference to FIG. 2. Shown in FIG. 2 is a schematic block diagram of the line of service 26 of FIG. 1. Line 26 includes a first unit 40, which preferably is a computer running the Windows NT server operating system, including voice server 12, which is coupled to post office unit 44 by CRcvr interface 46. Voice server 12 is connected to telephone network 22 preferably by a third party DS-1 interface 42. Second unit 50, which preferably is a computer running the Windows NT workstation operating system, includes acoustic server 14, which is coupled to post office unit 54 by CRcvr interface 52, and symbolic server 16, which is coupled to post office unit 56 by CRcvr interface 58. Third unit 60, which preferably is a computer running the Windows NT server operating system, includes task server 18, which is coupled to post office unit 64 by CRcvr interface 66. The CRcvr interfaces 46, 52, 58 and 66 are message-based communication interfaces which enable the server objects 12, 14, 16 and 18 to pass voice data and control data therebetween. The simplified code for the CRcvr interface is:

Interface CRcvr
{
void Idle ();
BOOL Receive (CMsg& msg);
};

where the CMsg object provides a wrapper around an array of data, which, in the case of the present invention, is the voice data message. The CMsg object adds to the voice data message a message header, sender ID, receiver ID, message ID and optional arguments.

A set of named pipes 80 is used to allow the flow of data between the post offices associated with each of the servers 12, 14, 16 and 18. A named pipe is a method for passing information from one computer process to other processes using a pipe or message holding place that is given a specific name. Unlike a regular pipe, a named pipe can be used by processes that do not have to share a common process origin and the message sent to the named pipe can be read by any authorized process that knows the name of the named pipe. As shown in FIG. 2, voice data flows only in the direction of arrow 70 and control data flows only in the direction of arrow 72, thus ensuring correct synchronization at all times.

In operation, the voice server 12 receives a voice data message in the form of a voice stream from the telephone network 22 over voice interface 42. The CRcvr interface 46 applies the appropriate headings on the voice data message and forwards the message to post office 44, which routes the message, based on the receiver ID added by the CMsg object, to the post office 54, via the named pipe 80. In addition to receiving the voice data message from the telephone network, voice server 12 controls all incoming and outgoing telephone calls, audio playback and recording of the transaction questions and voice prompt handling. It also performs system load and stress testing.

Acoustic server 14 receives the voice data message and converts the voice data message to a phonetic data message. The method implemented by acoustic server 14 for converting voice data to phonetic data is described in commonly assigned copending U.S. patent application Ser. No. 09/815,768 entitled A NOVEL APPROACH TO SPEECH RECOGNITION, which application is herein incorporated by reference in its entirety.

After the acoustic server 14 has converted the voice data message to a phonetic data message, CRvcr 52 attaches the appropriate header to the phonetic data message and transfers it to post office 56 via post office 54 and named pipe 80. Symbolic server 16 receives the phonetic data message from post office 56 via CRcvr interface 58 and converts the phonetic data message to a syntactic data message, based on the method described in commonly assigned copending U.S. patent application Ser. No. 09/815,769 entitled COMBINED SYNTACTIC AND SEMANTIC SEARCH, PARSING, AND APPLICATION, which application is herein incorporated by reference in its entirety.

Prior to the commencement of the transaction, Task server 18 initiates a connection to the internet 24 over connection 62 and downloads the transaction application code from the transaction initiator's website. The task server operates under the control of the application code to conduct the transaction defined in the code. Based on the application code, task server 18 controls the operation of the symbolic server 16 which, in turn, controls the operation of the acoustic server 14 and the voice server 12. All control data is transmitted in the direction of arrow 72 only.

Task server 18 receives the syntactic data message from the symbolic server via post office 56, named pipe 80, post office 64 and CRcvr interface 66. Task server 18 then converts the syntactic data message to a semantic representation of the original syntactic data message and processes the semantic data according to the application code.

In addition to the voice server 12, acoustic server 14, symbolic server 16 and task server 18, the line 26 may include a synthesizing server (not shown) for implementing text-to-speech synthesizers, for converting incoming text messages to audio streaming messages. The synthesizing server could be implemented when conducting transactions to hearing impaired respondents, for example. Furthermore, a first recording server could be associated with the symbolic server 16 for recording data flow from the symbolic server 16. Such data, which includes all the information required to reconstruct all application events, may be used to debug the application code. A second recording server may be associated with the voice server for recording the input voice data for later use in system development and quality-control purposes.

Figure 3:
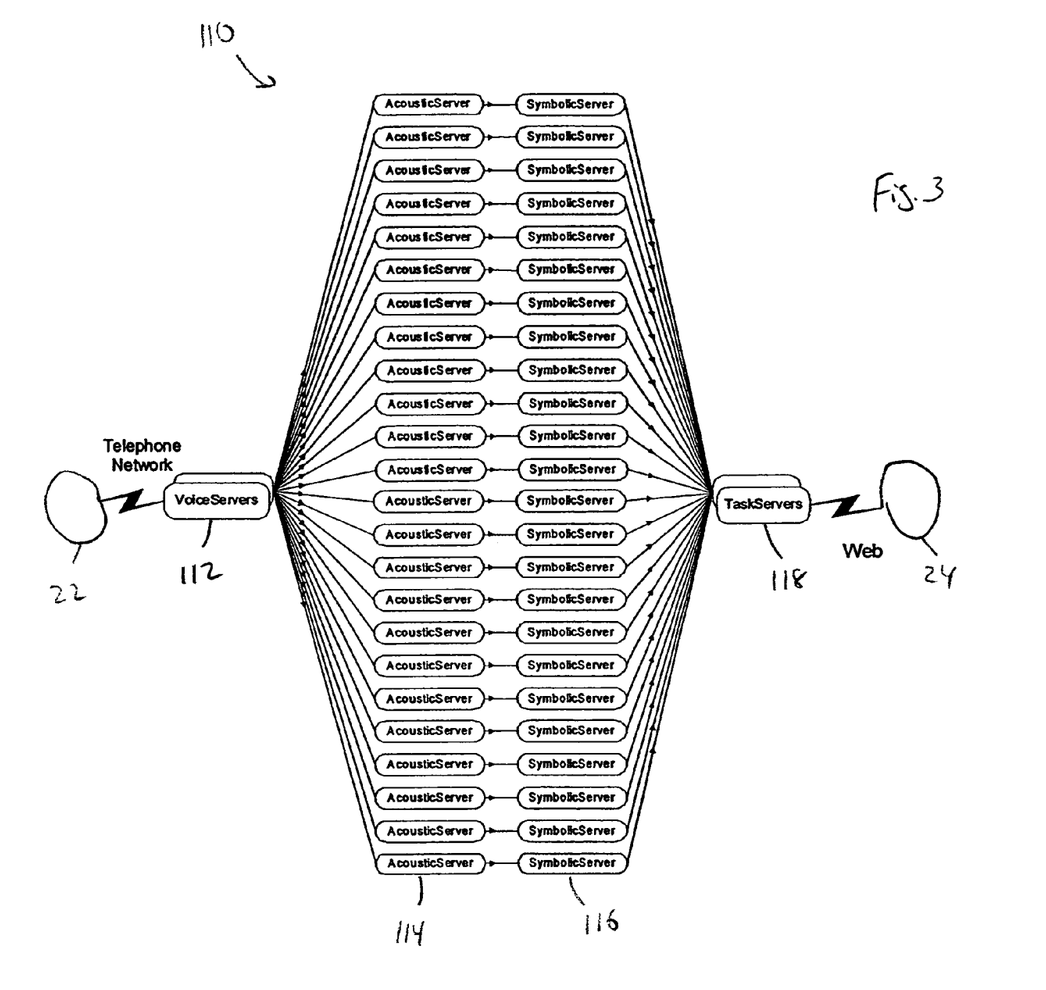
FIG. 3 is a schematic block diagram of an array of remote server objects in accordance with the present invention.
Figure 4:
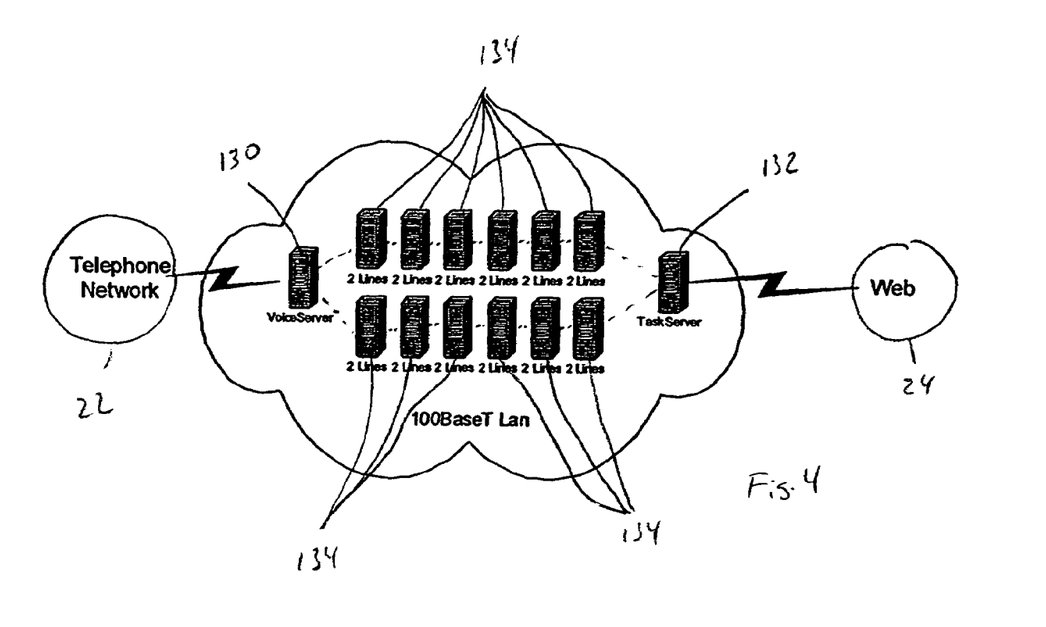
FIG. 4 is a schematic block diagram showing the hardware configuration of the system in accordance with the present invention.

While the system has been described as a single line of service 26, the system may be configured as a multiple-line system 110, as shown in FIG. 3. System 110 comprises a system having 24 lines of service, which enable the system 110 to conduct 24 different transactions simultaneously. Each line of service includes a voice server 112, an acoustic server 114, a symbolic server 116 and a task server 118. The configuration and operation of each line of service in system 110 is identical to the configuration and operation of line of service 26 described above. As shown in FIG. 4, all 24 voice servers 112 are grouped in a single Windows NT server PC 130 and all 24 task servers 118 are grouped in a single Windows NT server PC 132. A pair of acoustic servers and their associated symbolic servers are grouped within each of twelve Windows NT workstation PC's 134.

While the example described herein and shown in the figures depicts 24 lines of service, it will be understood that any reasonable number of lines of service may be implemented with the present invention. Furthermore, one or more of the servers may be used as backup servers in the event that one or more of the active servers becomes disabled. Since the system is network-based, any one of the severs can be replaced with a backup server simply by rerouting the necessary voice data and control data through the new server instead of the disabled server.

As set forth above, Each of the RSO's 12, 14, 16 and 18 are under the control of system monitor 20, FIG. 1. System monitor 20 operates under the control of a configuration file loaded into the system monitor by the administrator of the system 10. The system monitor 20 reads the configuration file and creates lines of service 26 according to the description contained in the file. It also creates and maintains a list of backup servers of each of the different types. Each of the RSO's in each line of service 26 created by the system monitor 20 is identified by DCOM programmatic identifiers. The system monitor 20 also assigns and registers post offices to each RSO and establishes named message pipes 80 for direct RSO-to-RSO high speed communication, as shown in FIG. 2. Once each post office is configured, each RSO has a direct connection to all other RSO's in the line.

In order to ensure that each RSO is operating properly, each RSO outputs a "heartbeat" message that is detected by the system monitor 20. As long as the heartbeat continues, the system monitor determines that each RSO in the system 10 is operating properly. If the system monitor 20 does not detect a heartbeat for a predetermined period of time, the system monitor determines that a particular RSO is disabled and configures a backup RSO to take the place of the disabled RSO. The replacement is handled such that the effected line of service is put out of operation until the repair is complete, so that the failure of the RSO affects only the current transaction. As soon as the system monitor 20 reconfigures the operating RSO's with a backup RSO for the disabled RSO, the line of service is operational. The system monitor is also capable of maintaining system-wide load balancing by reassigning RSO's in low load applications to applications having a greater demand for resources.

Accordingly, the present invention provides a system for and method of conducting telephonic transactions including a speech recognition system in which the architecture of the system is transparent to the respondent and to the party conducting the transaction. The system includes a plurality of remote server objects that are connected to each other over a network. The voice server RSO is connected to a telephone network for communication with the respondent. The task server RSO is connected to the internet and downloads the application code for a particular transaction from the website of the transaction initiator. The voice data message received by the voice server is processed by the system and is converted to a semantic representation of the voice data. Once the data is converted, it is applied to the application code to be processed. Since the architecture is transparent to the application, all maintenance, testing and support can be carried out without affecting or disrupting the active transactions.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A speech recognition system comprising:
   a line of service including:
      a first server object coupled to a telephone network for receiving a voice data message from said telephone network;
      a second server object having a first connection to said first server object for receiving said voice data message from said first server object and converting said voice data message to a phonetic data message;
      a third server object having a second connection to said second server object for receiving said phonetic data message from said second server object and converting said phonetic data message to a syntactic data message;
      a fourth server object having a third connection to said third server object for receiving said syntactic data message from said third server object and converting said syntactic data message to a semantic data message that includes a plurality of possible valid interpretations of said voice data message; and
      a control monitor for controlling the configuration of said first, second, third and fourth server objects in said line of service;
      wherein said first, second and third connections are formed over a first computer network.

2. The system of claim 1 wherein said fourth server object is coupled to a second computer network for receiving an application code from a client of said second computer network, said application code providing control data for the operation of said speech recognition system.

3. The system of claim 1 wherein said first computer network is one of a local area network and the internet.

4. The system of claim 2 wherein said second computer network is one of a local area network and the internet.

5. The system of claim 4 wherein said first, second and third connections are formed from named pipes.

6. The system of claim 1 wherein at least one of said first, second, third and fourth server objects periodically transmits a status signal to said system monitor, wherein the transmission of said periodic status signal from said at least one of said first, second, third and fourth server objects to said system monitor indicates that said one of said first, second, third and fourth server objects is operational.

7. The system of claim 6 wherein a nontransmission of said periodic status signal from said at least one of said first, second, third and fourth server objects to said system monitor indicates that said one of said first, second, third and fourth server objects is disabled.

8. The system of claim 1 further comprising at least one backup server object which is configured into the system by the system monitor when said at least one of said first, second, third and fourth server objects is disabled.

9. The system of claim 1 wherein said first, second, third and fourth server objects are configured by said system monitor according to the Distributed Component Object Model (DCOM).

10. The system of claim 9 wherein each of said first, second, third and fourth server objects include a post office for addressing and routing said voice data message, said phonetic data message, said syntactic data message and said semantic data message through said line of service from said telephone network to said second computer network.

11. The system of claim 9 further comprising additional lines of service connected between said telephone network and said second computer network.

12. The system of claim 1 wherein said first, second, third and fourth server objects are remote with respect to each other.

13. A method of processing speech comprising:
   (A) receiving, at a first server object, a voice data message from a telephone network;
   (B) transmitting said voice data message over a first computer network to a second server object;
   (C) converting said voice data message to phonetic data message in said second server object;
   (D) transmitting said phonetic data message from said second server object to a third server object over said first computer network;

(E) converting said phonetic data message to a syntactic data message in said third server object;

(F) transmitting said syntactic data message from said third server object to a fourth server object over said first computer network; and (G) converting, in said fourth server object, said syntactic data message to a semantic data message that includes a plurality of possible valid interpretations of said voice data message.

14. The method of claim 13 further comprising downloading an application code from a second computer networks wherein said application code includes control code for controlling operation of said first, second, third and fourth server objects.

15. The method of claim 14 wherein said first computer network is one of a local area network and the internet.

16. The method of claim 15 wherein said second computer network is one of a local area network and the internet.

17. The method of claim 16 wherein steps B, D and F comprise transmitting said voice data message, said phonetic data message and said syntactic data message, respectively, over named pipes.

18. The method of claim 16 further comprising configuring said first, second, third and fourth server objects with a control monitor.

19. The method of claim 18 further comprising the step of at least one of said first, second, third and fourth server objects transmitting a status signal to said control monitor, wherein the transmission of said periodic status signal from said at least one of said first, second, third and fourth server objects to said control monitor indicates that said at least of said first, second, third and fourth server objects is operational.

20. The method of claim 19 wherein the nontransmission of said periodic status signal from said at least one of said first, second, third and fourth server objects to said control monitor indicates that said at least of said first, second, third and fourth server objects is disabled.

21. The method of claim 16 wherein said first, second, third and fourth server objects are configured by said system monitor according to the Distributed Component Object Model (DCOM).

22. The method of claim 16 further comprising processing said semantic data message in said fourth server object according to said application code.

23. A speech recognition system comprising:
a line of service including:
a voice server object coupled to a telephone network for receiving a voice data message from said telephone network;
a speech recognition server having a connection to said voice server object for receiving said voice data message from said voice server object and converting said voice data message to a phonetic data message and converting said phonetic data message to a syntactic data message;
a task server object having a connection to said speech recognition server 6 receiving said syntactic data message from said speech recognition server object and convering said syntactic data message to a semantic data message that includes a plurality of possible valid interpretations of said voice data message; and
a control monitor for controlling the configuration of said voice server object,
said speech recognition server and said task server object in said line of service;
wherein said connections between said voice server object, said speech recognition server, said task server object and said control monitor are formed over a first computer network.

24. The system of claim 23 wherein said task server object is coupled to a second computer network for receiving an application code from a client of said second computer network, said application code providing control data for the operation of said speech recognition system.

25. The system of claim 24 wherein said second computer network is one of a local area network and the internet.

26. The system of claim 25 wherein said connections are formed from named pipes.

27. The system of claim 23 wherein said first computer network is one of a local area network and the internet.

28. The system of claim 23 wherein at least one of said voice server object, said speech recognition server and said task server object periodically transmits a status signal to said system monitor, wherein the transmission of said periodic status signal from said at least one of said first, second, third and fourth server objects to said system monitor indicates that said one of said first, second, third and fourth server objects is operational.

29. The system of claim 28 wherein a nontransmission of said periodic status signal from said at least one of said voice server object, said speech recognition server and said task server object to said system monitor indicates that said at least one of said voice server object, said speech recognition server and said task server object is disabled.

30. The system of claim 23 further comprising at least one backup saver object which is configured into the system by the system monitor when said at least one of said voice server object, said speech recognition server and said task server object is disabled.

31. The system of claim 23 wherein said voice server object, said speech recognition server and said task server object are configured by said system monitor according to the Distributed Component Object Model (DCOM).

32. The system of claim 31 wherein each of said voice server object, said speech recognition server and said task server object include a post office for addressing and routing said voice data message, said phonetic data message, said syntactic data message and said semantic data message through said line of service from said telephone network to said second computer network.

33. The system of claim 31 further comprising additional lines of service connected between said telephone network and said second computer network.

34. The system of claim 23 wherein said speech recognition server comprises (1) an acoustic server object for receiving said voice data message from said voice saver object and converting said voice data message to said phonetic data message and (2) a symbolic server object for receiving said phonetic data message from said acoustic server object and converting said phonetic data message to said syntactic data message.

35. The system of claim 34 wherein said voice, acoustic, symbolic and task server objects are remote with respect to each other.

36. The system of claim 23 wherein said voice server object, said speech recognition server and said task server object are remote with respect to each other.

* * * * *